(12) United States Patent
Adler et al.

(10) Patent No.: US 7,836,082 B2
(45) Date of Patent: *Nov. 16, 2010

(54) REDUCING INDEX SIZE FOR MULTI-LEVEL GRID INDEXES

(75) Inventors: David William Adler, Mount Tremper, NY (US); Knut Stolze, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 366 days.

This patent is subject to a terminal disclaimer.

(21) Appl. No.: 12/020,474

(22) Filed: Jan. 25, 2008

(65) Prior Publication Data

US 2008/0133559 A1  Jun. 5, 2008

Related U.S. Application Data

(63) Continuation of application No. 11/255,357, filed on Oct. 20, 2005, now Pat. No. 7,379,944, which is a continuation of application No. 10/141,919, filed on May 10, 2002, now Pat. No. 7,373,353.

(51) Int. Cl.
*G06F 17/00* (2006.01)

(52) U.S. Cl. ............... 707/791; 707/802; 707/822; 707/828

(58) Field of Classification Search .......... 707/600–831
See application file for complete search history.

(56) References Cited

U.S. PATENT DOCUMENTS

| | | |
|---|---|---|
| 5,745,899 A | 4/1998 | Burrows |
| 5,781,899 A | 7/1998 | Hirata |
| 5,832,475 A | 11/1998 | Agrawal et al. |
| 5,845,277 A | 12/1998 | Pfeil et al. |
| 5,895,467 A | 4/1999 | Ubell et al. |
| 5,963,956 A | 10/1999 | Smartt |
| 6,014,614 A | 1/2000 | Herring et al. |
| 6,021,409 A | 2/2000 | Burrows |
| 6,038,258 A | 3/2000 | Chun et al. |
| 6,101,492 A | 8/2000 | Jacquemin et al. |
| 6,122,628 A | 9/2000 | Castelli et al. |

(Continued)

FOREIGN PATENT DOCUMENTS

WO  0133395  5/2001

OTHER PUBLICATIONS

Aboulnaga et al., "Accurate Estimation of the Cost of Spatial Selections'" Proceedings of the IEEE International Conference on Data Engineering, 2000, pp. 123-134.

(Continued)

*Primary Examiner*—Isaac M Woo
(74) *Attorney, Agent, or Firm*—Janaki K. Davda; Konrad Raynes & Victor LLP

(57) ABSTRACT

The number of index entries in a grid index for indexing geometric shapes is reduced by establishing a pool storage area for geometric shapes, selecting a threshold number of grid cells which a geometric shape may overlap, storing the shape in the grid index if a geometric shape overlaps a number of grid cells not exceeding the threshold number, and storing the shape in the pool storage area if the geometric shape overlaps a number of grid cells which exceeds the threshold number.

13 Claims, 11 Drawing Sheets

U.S. PATENT DOCUMENTS

| | | | |
|---|---|---|---|
| 6,134,541 | A | 10/2000 | Castelli et al. |
| 6,154,748 | A | 11/2000 | Gupta et al. |
| 6,195,659 | B1 | 2/2001 | Hyatt |
| 6,201,884 | B1 | 3/2001 | Van Bemmel et al. |
| 6,219,662 | B1 | 4/2001 | Fuh et al. |
| 6,223,182 | B1 | 4/2001 | Agarwal et al. |
| 6,233,571 | B1 | 5/2001 | Egger et al. |
| 6,253,196 | B1 | 6/2001 | Fuh et al. |
| 6,266,663 | B1 | 7/2001 | Fuh et al. |
| 6,308,177 | B1 | 10/2001 | Israni et al. |
| 6,338,056 | B1 | 1/2002 | Dessloch et al. |
| 6,353,832 | B1 | 3/2002 | Acharya et al. |
| 6,439,783 | B1 | 8/2002 | Antoshenkov |
| 6,460,026 | B1 | 10/2002 | Pasumansky |
| 6,484,179 | B1 | 11/2002 | Roccaforte |
| 6,505,205 | B1 | 1/2003 | Kothuri et al. |
| 6,510,435 | B2 | 1/2003 | Bayer |
| 6,549,660 | B1 | 4/2003 | Lipson et al. |
| 6,611,609 | B1 | 8/2003 | Zhu |
| 6,629,102 | B1 | 9/2003 | Malloy et al. |
| 6,636,849 | B1 | 10/2003 | Tang et al. |
| 6,636,870 | B2 | 10/2003 | Roccaforte |
| 6,687,701 | B2 | 2/2004 | Karamanolis et al. |
| 6,700,574 | B1 | 3/2004 | Song |
| 6,711,563 | B1 | 3/2004 | Koskas |
| 6,732,120 | B1 | 5/2004 | Du |
| 6,778,996 | B2 | 8/2004 | Roccaforte |
| 6,831,668 | B2 | 12/2004 | Cras et al. |
| 6,915,289 | B1 | 7/2005 | Malloy et al. |
| 6,922,700 | B1 | 7/2005 | Aggarwal et al. |
| 6,959,304 | B1 | 10/2005 | Teig et al. |
| 7,016,911 | B2 | 3/2006 | Bousfield et al. |
| 7,143,098 | B2 | 11/2006 | Chen et al. |
| 7,171,427 | B2 | 1/2007 | Witkowski et al. |
| 7,177,882 | B2 | 2/2007 | Xie et al. |
| 7,197,500 | B1 | 3/2007 | Israni et al. |
| 7,379,944 | B2 | 5/2008 | Adler et al. |
| 7,383,275 | B2 | 6/2008 | Chen et al. |
| 7,389,283 | B2 | 6/2008 | Adler |
| 2002/0035432 | A1 | 3/2002 | Kubica et al. |
| 2002/0095421 | A1 | 7/2002 | Koskas |
| 2002/0129032 | A1 | 9/2002 | Bakalash et al. |
| 2002/0156779 | A1 | 10/2002 | Elliott et al. |
| 2002/0184187 | A1 | 12/2002 | Bakalash et al. |
| 2002/0188581 | A1 | 12/2002 | Fortin et al. |
| 2003/0126143 | A1 | 7/2003 | Roussopoulos et al. |
| 2003/0187867 | A1 | 10/2003 | Smartt |
| 2004/0019581 | A1 | 1/2004 | Davis, II et al. |
| 2004/0036688 | A1 | 2/2004 | Cutlip |
| 2004/0117358 | A1 | 6/2004 | von Kaenel et al. |
| 2004/0225665 | A1 | 11/2004 | Toyama et al. |
| 2005/0137994 | A1 | 6/2005 | Fortin et al. |
| 2005/0198008 | A1 | 9/2005 | Adler |
| 2006/0036628 | A1 | 2/2006 | Adler et al. |
| 2006/0041551 | A1 | 2/2006 | Adler et al. |
| 2006/0106833 | A1 | 5/2006 | Chen et al. |
| 2008/0021893 | A1 | 1/2008 | Bakalash et al. |
| 2008/0052303 | A1 | 2/2008 | Adler et al. |
| 2008/0133469 | A1 | 6/2008 | Chen et al. |
| 2008/0162424 | A1 | 7/2008 | Adler |

OTHER PUBLICATIONS

Acharya et al., "Selectivity Estimation in Spatial Databases", Proceedings of the 1999 ACM SIGMOD International Conference on Management of Data, Jun. 1999, pp. 13-24.

Aref et al., "Efficient Window Block Retrieval in Quadtree-Based Spatial Databases", GeoInformatica, vol. 1, Iss.1 Apr. 1997, pp. 59-91.

Barrodale Computing Services, Ltd. (BCS), "Storing and Manipulating Gridded Data in Databases", 2002, 13 pp.

Davis, "IBM's DB2 Spatial Extender: Managing GEO-Spatial Information within the DBMS", May 1998, 26 pp.

Gaede, "Multidimensional Access Methods", ACM Computing Surveys (CSUR), vol. 30, Iss. 2, Jun. 1998, pp. 170-231.

Gunther, "Der Zellbaum: Ein Index fur geometrische Datenbanken (The Cell Tree: An Index for Geometric Databases)", nformatik-Forschung und Entwicklung, vol. 4, 1989, 13 pp.

Harley, "ArcSDE Tuning Tips and Tradeoffs", (online), (retrieved on Jul. 23, 2003), retrieved from the Internet at <URL:http//gis2.esri.com/library/userconf/proc01/professional/papers/pap869/p869.htm>, 17 pp.

Heidelberger, "Parallel Index Scan Using Fetch-And-Add in Multi-Processing", Retrieved from the internet at <URL : http://www.ip.com/pubview/IPCOM000057711D.html>. Jun. 1, 1988, 3 pp.

Hutflesz et al. "Twin Grid Files: Space Optimizing Access Schemes", 1988, 8 pp.

IBM Corporation, "IBM DB2 Spatial Extender User's Guide and Reference", Version 7, Second Edition, Jun. 2001 373 pp.

Morkbel et al. "Irregularity in Multi-Dimensional Space-Filling Curves with Applications in Multimedia Databases", Proceedings of the Tenth International Conference on Information and Knowledge Management, Nov. 2001, pp. 512-519.

Nievergelt et al., "The Grid File : An Adaptable, Symmetric Multikey File Structure", ACM Transactions on Database Systems, vol. 9, No. 1, Mar. 1984, pp. 38-71.

Pagel et al., "Towards an Analysis of Range Query Performance in Spatial Data Structures", Proceedings of the Twelfth ACM SIGACT-SIGMOD-SIGART Symposium on Principles of Database Systems, 1993, pp. 214-221.

Raad, "ArcSDE Performance Tips", Proceedings of the Nineteenth Annual ESRI User Conference, 1999, 58 pp.

Rigaux et al., "Spatial Databases with Application to GIS", Morgan Kaufmann, 2002, pp. 209-219.

Samet, "Spatial Data Structures", Modern Database Systems : The Object Model, Interoperability, and Beyond, Addison Wesley/ACM Press, 1995, pp. 361-385.

Shekhar et al., "Spatial Databases a Tour", Prentice-Hall, 2003, pp. 96-100.

Shipman, "Moving from a Single User Database to Multi-User ArcSDE and the Geodatabase (Session 1)", Nineteenth Annual ESRI User Conference, 1999, 42 pp.

Ho, C.T., R. Agrawal, N. Megiddo, and R. Srikant, "Range Queries in OLAP Data Cubes", vol. 26, No. 2 © Jun. 1997 ACM, pp. 73-88.

Rotem, D. and A. Segev, "Algorithms for Multidimensional Partitioning of Static Files", IEEE Transactions on Software Engineering, vol. 13, No. 11, Nov. 1988, pp. 1700-1710.

Gaede, V., and O. Gunther, "Multidimensional Access Methods", Imperial College, London, UK, pp. 1-43 (also published ACM Computing Surveys (CSUR), vol. 30, Iss. 2, Jun. 1998, pp. 170-231).

Gunther, O., "Der Zellbaum: Ein Index für geometrische Datenbanken [The Cell Tree: An Index for Geometric Databases]", nformatik—Forschung und Entwicklung, vol. 4, 1989, Total 13 pp [ English Abstract on p. 1, col. 1, starting on line 28].

REDUCING INDEX SIZE FOR MULTI-LEVEL GRID INDEXES

CROSS REFERENCE TO RELATED APPLICATIONS

This application is a continuation application of and claims the benefit of "Reducing Index Size for Multi-Level Grid Indexes", U.S. Pat. No. 7,379,944, issued May 27, 2008, having application Ser. No. 11/255,357, filed Oct. 20, 2005, which is a continuation of U.S. Pat. No. 7,373,353, issued on May 13, 2008, application Ser. No. 10/141,919, filed May 10, 2002, the entire contents of each of which are incorporated herein by reference.

The present application is related to U.S. Pat. No. 7,383,275, issued on Nov. 28, 2006, U.S. application Ser. No. 10/144,058, filed May 10, 2002, the entire contents of which are incorporated herein by reference.

The present application is also related to U.S. Pat. No. 7,143,098, issued Nov. 28, 2006, U.S. application Ser. No. 10/144,389, filed May 10, 2002, the entire contents of which are incorporated herein by reference.

The present application is also related to U.S. Pat. No. 7,373,353, issued on May 13, 2008, U.S. application Ser. No. 10/141,919, entitled "Reducing Index Size for Multi-Level Grid Indexes," filed on May 10, 2002, by David Adler et al., the entire contents of which are incorporated herein by reference.

The present application is also related to U.S. Pat. No. 7,437,372 U.S, issued on Oct. 14, 2008, with application Ser. No. 11/255,297, entitled "Reducing Index Size for Multi-Level Grid Indexes," filed on Oct. 20, 2005, by David Adler et al., which is a continuation application of U.S. Pat. No. 7,143,098, the entire contents of which are incorporated herein by reference.

The present application is also related to abandoned U.S. application Ser. No. 10/792,446, entitled "Index Exploitation For Spatial Data," filed on Mar. 2, 2004, by David Adler, the entire contents of which are incorporated herein by reference.

The present application is also related to U.S. application Ser. No. 11/255,296, entitled "Reducing Index Size for Multi-Level Grid Indexes," filed on Oct. 20, 2005, by David Adler et al., is a divisional application of U.S. Pat. No. 7,373,353, the entire contents of which are incorporated herein by reference.

The present application is also related to U.S. application Ser. No. 11/931,786, entitled "Reducing Index Size for Multi-Level Grid Indexes," filed on Oct. 31, 2007, by David Adler et al., which is a continuation application of U.S. Pat. No. 7,379,944, which is a continuation application of U.S. Pat. No. 7,373,353, the entire contents of which are incorporated herein by reference.

The present application is also related to U.S. application Ser. No. 12/021,193, entitled "Systems and Computer Program Products to Improve Indexing of Multidimensional Databases," filed on Jan. 28, 2008, which is a continuation of U.S. Pat. No. 7,383,275, issued on Nov. 28, 2006, the entire contents of which are incorporated herein by reference.

The present application is also related to U.S. Pat. No. 7,389,283, issued Jun. 17, 2008, U.S. application Ser. No. 11/007,132, entitled "System And Method For Determining An Optimal Grid Index Specification For Multidimensional Data," filed on Dec. 7, 2004, by David Adler, the entire contents of which are incorporated herein by reference.

The present application is also related to abandoned U.S. application Ser. No. 12/050,877, entitled "Reducing Index Size for Multi-Level Grid Indexes," filed on Mar. 18, 2008, which is a continuation application of U.S. Pat. No. 7,389,283, the entire contents of which are incorporated herein by reference.

BACKGROUND OF THE INVENTION

1. Field of the Invention

The present invention is directed to the field of computer-based database management systems. It is more particularly directed to reducing index size when grid-indexing techniques are applied to multidimensional data stored in a database management system.

2. Description of the Background Art

Indexing techniques are used to quickly access data that has been sorted and assigned an index. Spatial data is typically information associated with geometric shapes such as lines, points, poly-lines, polygons, and surfaces. Spatial data is often very large and may have two, three, or more dimensions. Spatial data may be indexed. Indexing such data by traditional techniques, such as with a B-tree, may not be feasible due to the large amount of computer resources required to index spatial data. Further, B-tree indexing is typically associated with single-dimensional data, not multi-dimensional data. Therefore, sorting capabilities associated with B-tree indexing are typically not sufficient to be efficiently applied to multidimensional data. To reduce data processing time, various spatial indexing techniques have been studied and developed. Grid indexing is one of these indexing techniques associated with searching spatial multidimensional data, and is used by the product marketed under the trademark IBM DB2® Spatial Extender.

An index enables fast access to a certain subset of data contained in a larger set of data. The index can include a data structure and indicators of the techniques used to build, maintain, and search the data structure for the purpose of accessing a subset of data. For example, an index may define a data structure that is used to access a specific geometric shape included in a set of spatial data. The particular index of the present example may define a data structure that contains references to the minimum-bounding rectangles associated with various geometric shapes in a spatial data set. By accessing locator references associated with the minimum-bounding rectangles the process of accessing particular geometric shapes in a spatial data set is simplified.

A grid index is a space-partitioning. It divides space into rectangles (or squares) called grid cells, using a mathematical formula to determine the boundaries of the grid cells. One approach for such a formula is to define a grid cell size and to lay each boundary as a multiple of the grid cell size. When indexing spatial objects (geometries), the geometries are overlaid with the so defined grid. Depending on the size of the geometry and the grid cell size, a geometry might overlap with more than one grid cell, i.e. it crosses a boundary between grid cells.

When a geometry is indexed in an index maintenance operation, an index key is stored in the index for each grid cell that overlaps with the geometry. Usually, the index entry uniquely identifies the grid cell for which the overlap was noted. For example, the identifier used for the index can be any point in the grid cell, such as its lower-left corner, or its center. Alternatively, other techniques for identifying the overlapping grid cell can be used for the identifier, such as dividing the coordinates by the grid size. For example, using a grid size of 10 with the coordinate value (46, 32) and performing integer arithmetic would identify the grid cell (4, 3) where "4" represents the fourth grid cell in one dimension and "3" represents the third grid cell in another dimension.

Several approaches exist to improve performance of the index maintenance. As previously mentioned, the geometry itself is abstracted by its minimum-bounding rectangle (MBR). That allows for a very simple and fast way to identify the grid cells that overlap with the MBR.

As can be appreciated, a geometry, or its MBR, potentially can overlap many grid cells. Although the computation of the identifiers for all the overlapping grid cells is straightforward if the geometry is abstracted, the task to compute all those identifiers grows linearly with the number of overlaps encountered. Also, storage is needed for all the index entries, which effectively increases costs for storage, and also increases the cost of evaluation of the index because more index entries have to be processed at query time.

A conventional approach to reduce costs is to introduce multiple levels of grids, each level with a different grid size. A geometry is indexed at exactly one grid level. Accordingly, with a larger grid size, fewer index entries are produced. However, the downside of using larger grid sizes is that they do not provide as fine a resolution as smaller grid sizes.

Some implementations of grid indexes (e.g., a grid index implemented in the DB2® Spatial Extender) use a fixed number that sets the maximum number of levels. Although using multiple levels reduces the problem of having many index entries for large geometries, the problem does not entirely vanish. Even at the coarsest grid level, an extremely large geometry can produce thousands of index entries. Also, the grid sizes for the multiple levels are usually tuned to work best for the common set of data and are not tuned for handling such exceptions.

To provide an example, assume two grid levels and the data set to be indexed is the street network of the United States of America. One will probably choose a very small grid size to accommodate the short streets in neighborhoods. The second grid size might be used to accommodate longer streets in cities or between cities. Consider now a road like the I-40 highway, that crosses the entire continent from west to east. Indexing this road on either of the two levels produces a vast number of index entries, whose computation is expensive and which greatly increases the number of indices. This complicates the maintenance of the indices and impacts the data processing capabilities of a database management system underlying the storage of the spatial data.

A conventional approach to handling such large geometries is not to allow such geometries to be indexed at all. If a geometry would produce more index entries than what is defined by a threshold, an error is returned in that conventional approach. In a database context such as the context in which the DB2® Spatial Extender runs, this implies that an insert or update operation would abort due to error.

The conventional approach leaves the user with a number of potentially unattractive options, e.g. to not use an index at all, to not insert the geometry, to break the geometry up into smaller pieces, or to change the index definition to use coarser grid sizes and thus reduce the number of entries produced. A problem with this last option is that changing the index impacts existing data, possibly making performance of the overall index worse.

SUMMARY OF THE INVENTION

Methods of reducing the number of index entries in the formation of a grid index are described that include establishing a pool storage area for storing a pool of geometric shapes. A threshold number of grid cells which a geometric shape may overlap is selected and it is determined how many grid cells a geometric shape overlaps. If a geometric shape overlaps a number of grid cells that does not exceed the threshold number, an index for the shape is stored in the grid index. If a geometric shape overlaps a number of grid cells exceeding the threshold number, an index for the shape is stored in the pool storage area.

Also described here are methods of querying both a grid index of first geometric shapes that includes a plurality of indexes and a pool of larger, second geometric shapes. The method includes evaluating the grid index of first shapes to produce a group of one or more candidates based on cells designated in a query that overlap respective first shapes in the index. The geometric shapes from the pool are added to the group of candidates to produce an interim group of candidates. The interim group of candidates is filtered by comparing a query area specified in the query with approximations of the candidates of the interim group to produce filtered candidate objects. Those filtered candidates that satisfy the query are determined by comparing the first and second geometric shapes corresponding to the filtered candidates with the query area. The shapes that overlap with the query area are determined to satisfy the query.

Usage of a storage pool for large geometric shapes reduces the number of entries in the index and improves maintenance and use of the index.

Other aspects and advantages of the present invention will become apparent from the following detailed description, taken in conjunction with the accompanying drawings.

BRIEF DESCRIPTION OF THE DRAWINGS

In the following detailed description and in the several figures of the drawings, like elements are identified with like reference numerals.

DESCRIPTION OF THE INVENTION

Figure 1A:
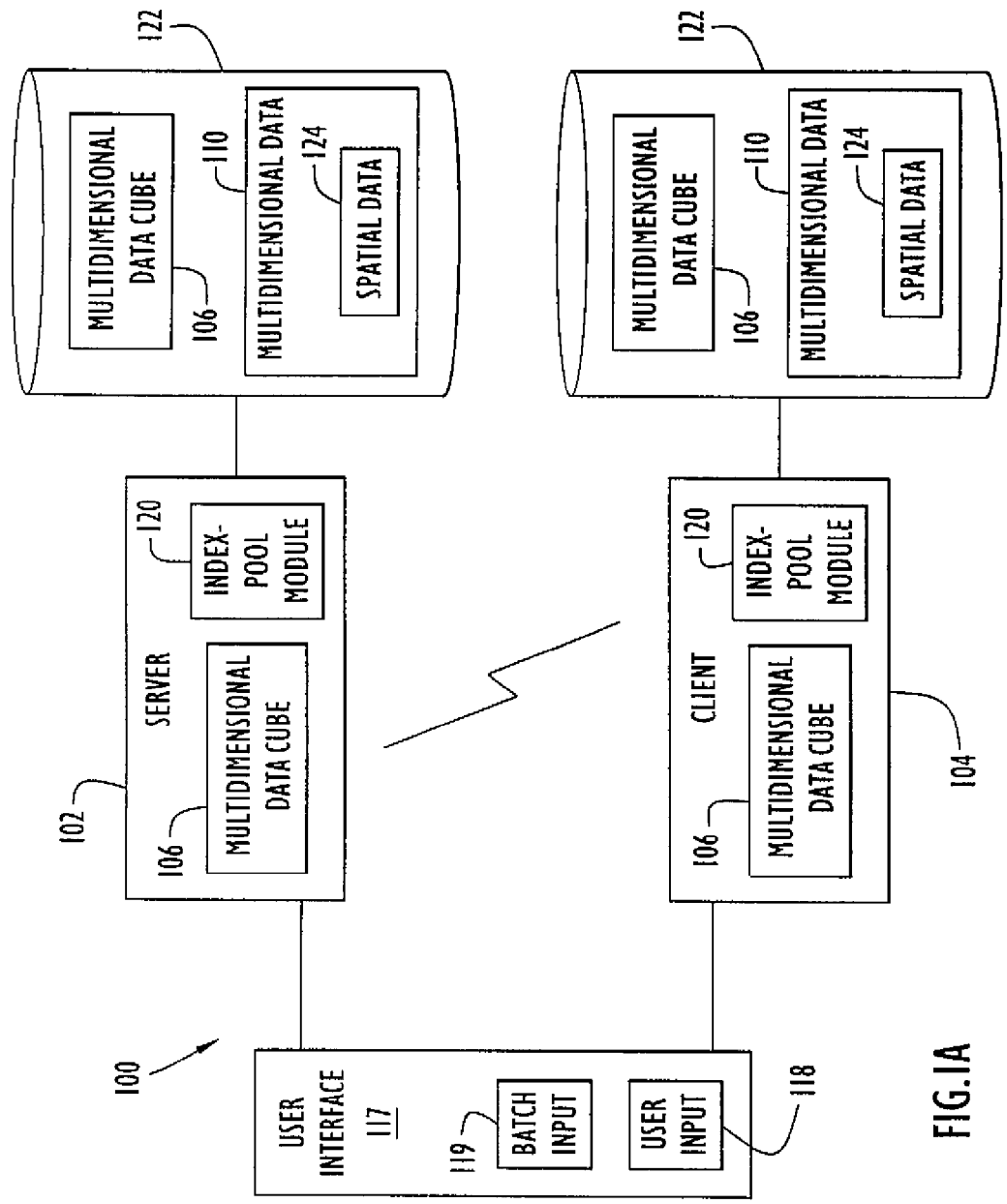
FIG. 1A is a block diagram that illustrates a client-server computer configuration.

As shown in FIG. 1A, a method of indexing large geometries and using those indices can operate in a client-server computer system 100 configuration. Therefore, a client computer system 104 can communicate with a server computer system 102 during such operation. An index-pool module 120 operates in either the client 104 or the server 102 to store and use such indices. For example, information can be communicated to either the server 102 or the client 104 via a user interface 117 and subsequently can be used by an index-pool module 120 to perform a query operation regarding geometric shapes. The user interface 117 can include either a user input unit 118 and/or a batch input unit 119.

Further, a multidimensional data cube 106 can be configured in the memory of either the client 104 or the server 102. Alternatively, a multidimensional data cube 106 can be configured in computer storage such as that of a disk 122. Spatial data 124 is a specific type of multidimensional data 110 that can be stored on disk 122. The terms "multidimensional data cube" and "data cube" will be used interchangeably herein.

Figure 1B:
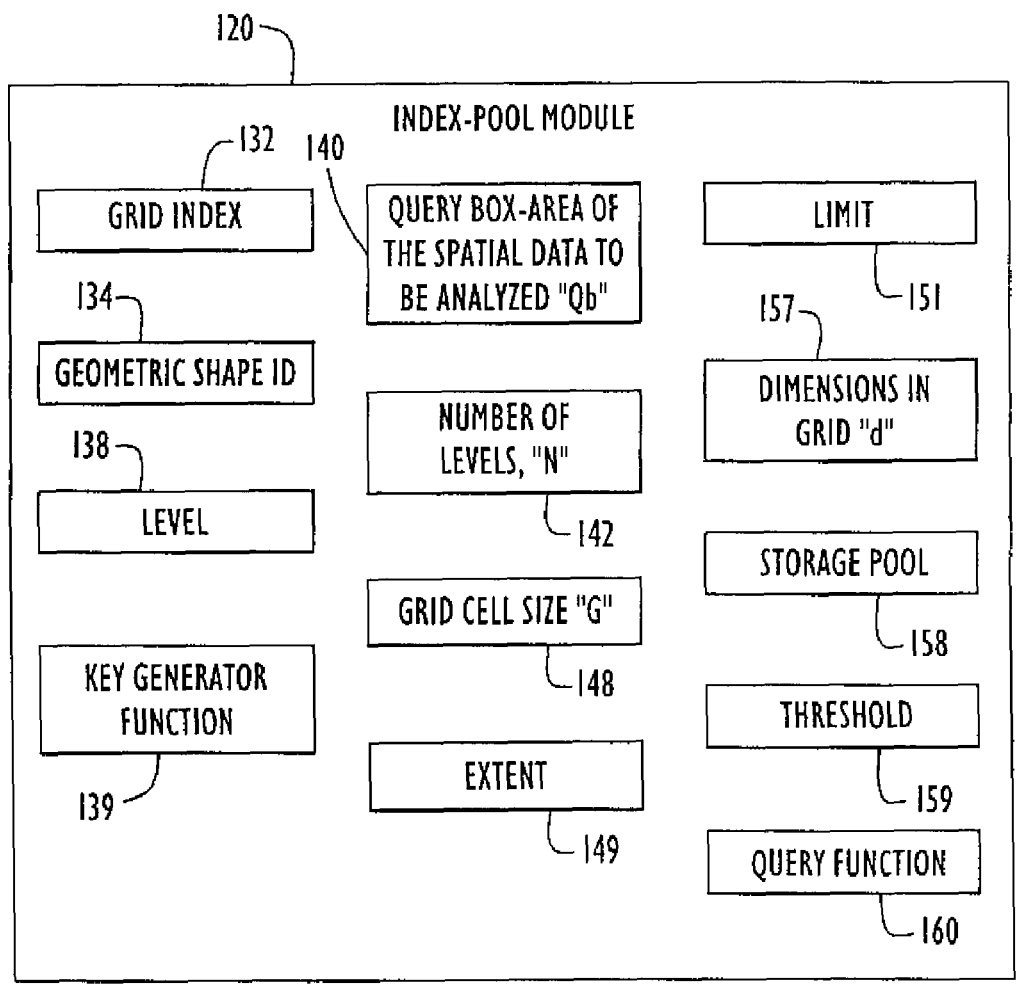
FIG. 1B is a block diagram that illustrates an index-pool module.

FIG. 1B is a block diagram that illustrates the index-pool module 120 used to operate on the spatial data 124. Spatial data 124 and other elements of the index pool module 120 are described below with reference to FIG. 1A and elements 202, 204, and 206 of a multidimensional data cube 106 are described with reference to FIG. 2A. A technique for partitioning space into grids 202 can include ascribing different levels 138 to the partitioned space. The levels 138 can represent partitions of the space at various resolutions of the cells 206 of the grid 202. Such levels 138 can be used in connection with designating indices for large geometries. The variable "N," represents the number of grid levels 142. If the number of grid cells 146 exceeds a user-defined limit 151 the next level 138 of information is determined. Grid index 132 stores geometric shape information and is used to search spatial data 124.

Figure 2A:
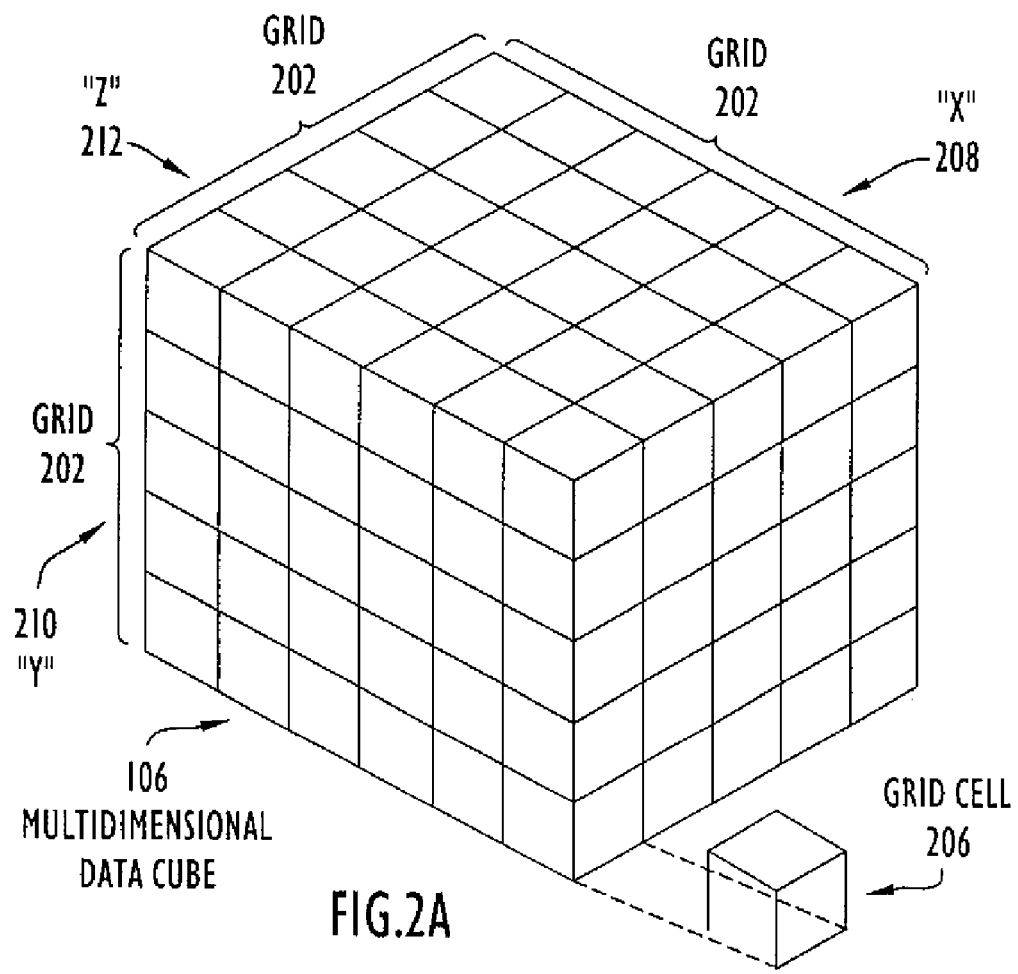
FIG. 2A is a diagramatic illustration of a multidimensional data cube.
Figure 2B:
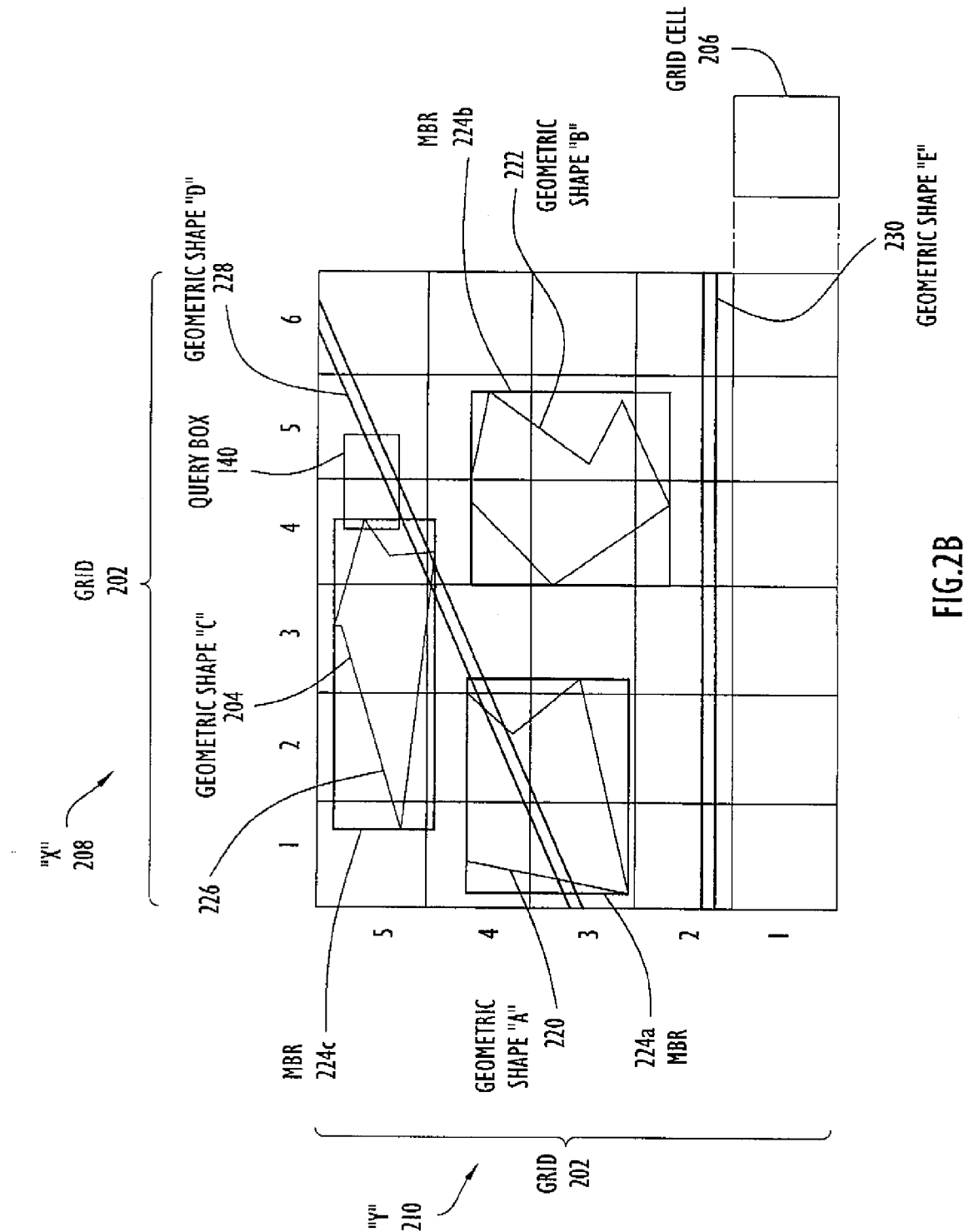
FIG. 2B depicts a grid and geometric shapes.

A geometric shape identifier (ID) 134 is used during the operation to identify a geometric shape so that the information associated with the geometric shape 204, as shown in FIG. 2B, can be indexed. The geometric shape ID 134 and the associated level 138 information are combined into the geometric shape ID 134 that is a single, unique value. That single, unique value is identified with the associated grid cell 206. Information about higher level abstractions of a geometric shape, such as its minimum boundary rectangle, can be stored with the exact geometric shape or can be stored separately from it, such as in the index for the geometric shape. An SQL query that calls a "key generator" function 139 can be used to create index entries associated with each geometric shape 204.

Storage pool 158 is a storage area that can be a separate data structure or can be embedded within the same data structure as the index. If the latter approach is chosen, the separate pool can be modeled as a special grid level, that has its own identifier but no associated grid size. Those geometries that exceed a certain threshold(s) 159 are stored in the storage pool 158. A special query function 160 that includes data in both the grid index 132 and the storage pool 158 is included in the index pool module 120. A query box area "$Q_b$" 140 is the average size of an area that is analyzed. The area covered by $Q_b$ 140 may be smaller than the size of the extent of data that is analyzed 149. A preferred grid cell size "G" 148 can be determined, as disclosed in U.S. patent application Ser. No. 10/144,058, filed May 10, 2002, the entire contents of which are incorporated herein by reference.

As shown in FIG. 2A the multidimensional data cube 106 can be suitably configured for operation with the geometries to be processed. The grid 202 represents the decomposition of data into units that may be uniform or of varying size. Grid cell 206 is a specific instance of a unit contained within a grid 202. Specific examples of grids 202 include the "X" dimension grid that is shown in element 208, the "Y" dimension grid that is shown in element 210, and the "Z" dimension grid that is shown in element 212.

FIG. 2B illustrates a two-dimensional grid 202. A preferred embodiment operates on spatial data 124, shown in FIG. 1A, that is information that represents geometric shape 204. The two-dimensional grid 202 includes examples of an X dimension grid 208 and a Y dimension grid 210. Further, the X dimension grid 208 includes six units and the Y dimension grid 210 includes five units. The two-dimensional grid 202 includes grid cells 206 that can be referenced by the units of the X dimension grid 208 and the Y dimension grid 210. The geometric shape "A" as shown in element 220, the geometric shape "B" as shown in element 222, and the geometric shape "C" as shown in element 226 are each bounded by minimum bounding rectangles (MBRs) 224a, 224b and 224c, respectively. The variable $Q_b$ 140 represents a query box size and in this example $Q_b$ 140 overlaps two grid cells 206.

Figure 2C:
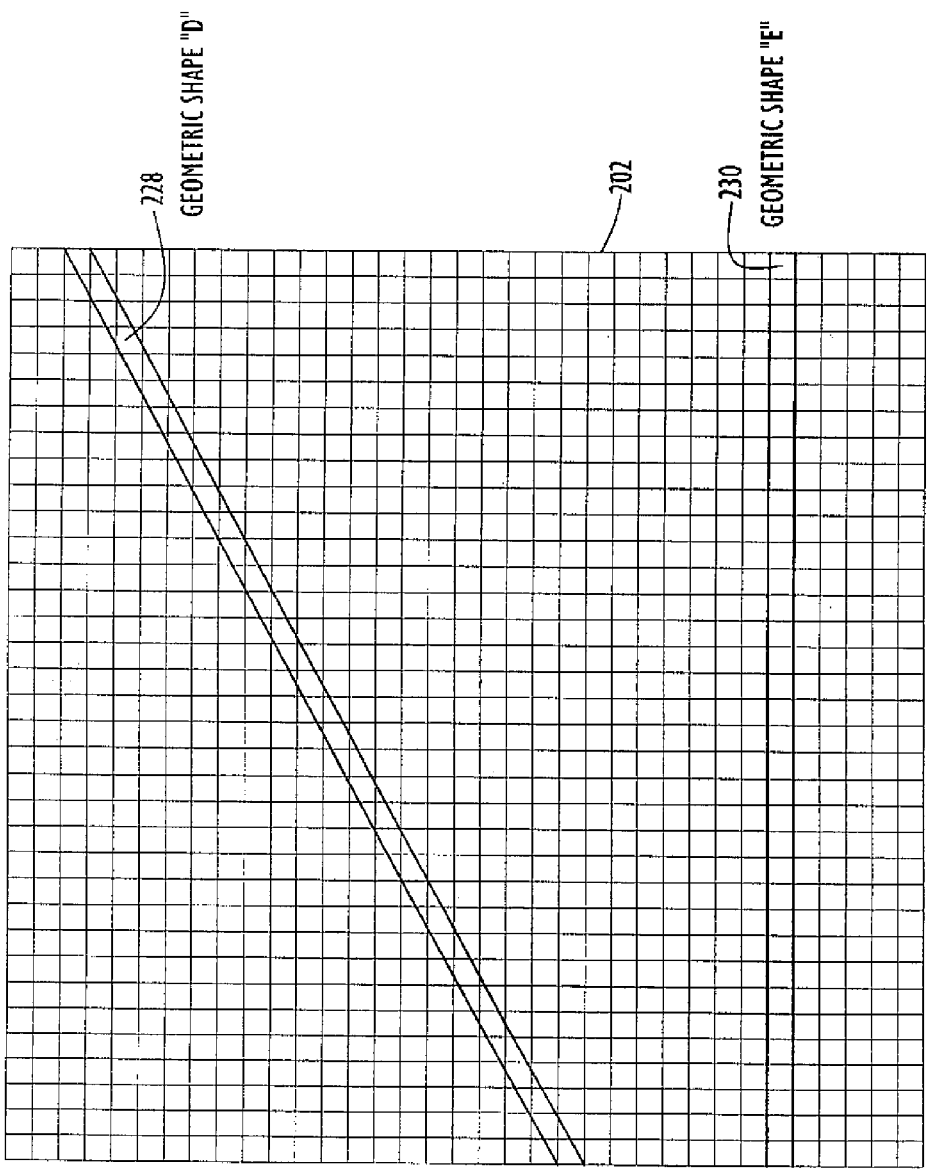
FIG. 2C depicts a larger grid portion than FIG. 2B.

Also present in FIG. 2B are geometric shapes 228 and 230, which are larger than the other geometric shapes. For example, in a geographical context shapes 228 and 230 could represent long roads such as transcontinental highways. A better idea of the potential size of shapes 228 and 230 may be had by referring to FIG. 2C which shows a larger portion of the grid overlaid on these shapes. In actuality, shapes 228 and 230 could overlap thousands of grid cells. Here, large shapes such as 228 and 230 are excluded from the grid index and instead are stored in a storage pool.

Figure 2D:
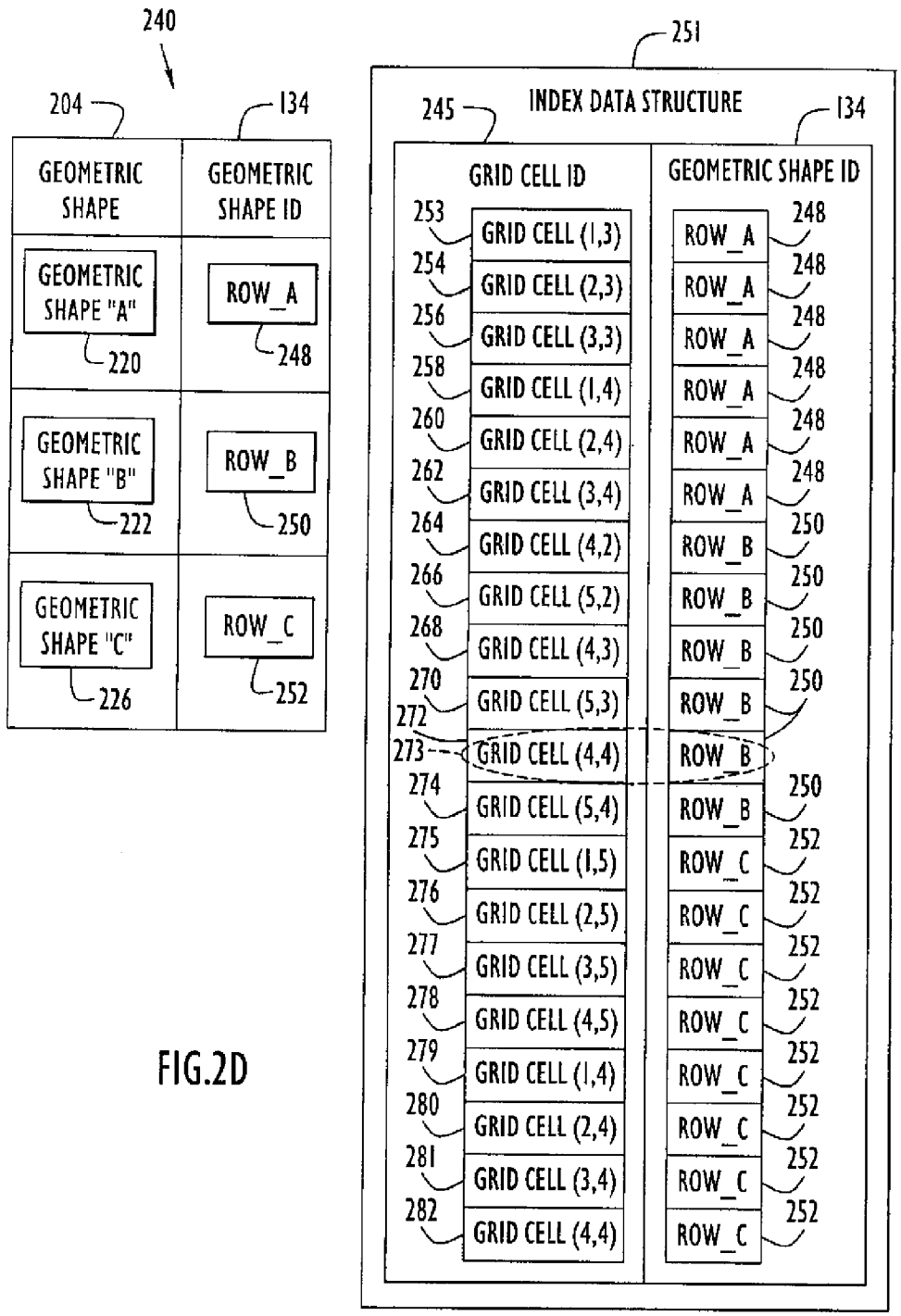
FIG. 2D is a block diagram that illustrates a table relating geometric shapes with an identifier, and index data structures.

FIG. 2D is a block diagram that illustrates a table 240 relating geometric shapes 204 with geometric shape identifiers 134. FIG. 2D also shows the index data structure 251. An SQL statement can be used to generate the index data structure 251 that includes geometric shape ID's 134 and grid cell ID's 245. For example, the geometric shape A 220 as shown in FIG. 2B, is associated with the Row-A geometric shape ID, as shown in element 248. Also, the geometric shape B 222 as shown in FIG. 2B, is associated with the Row-B geometric shape ID, as shown in element 250. Further, the geometric shape C 226 as shown in FIG. 2B, is associated with the Row-C geometric shape ID, as shown in element 252.

The geometric shape ID 134 and the grid cell ID 245 can be used jointly as an index to locate a specific geometric shape 204. Indexes provide quick access to data and can enforce uniqueness on the rows in the table and include index entries, such as index entry 273 which is an entire row in the index data structure 251, and includes a grid cell ID 245 and a geometric shape ID 134.

The index data structure 251 is used to associate each grid cell 206 that overlaps with the MBR of a geometric shape thereby enabling searches of the information associated with a geometric shape. For example, the MBR of geometric shape A, as shown in element 224a of FIG. 2B, overlaps will the following grid cells 206; grid cell (1,3) as shown in element 253 of FIG. 2D, grid cell (2,3) as shown in element 254, grid cell (3,3) as shown in element 256, grid cell (1,4) as shown in element 258, grid cell (2,4) as shown in element 260, and grid cell (3,4) as shown in element 262. Elements 253, 254, 256, 258, 260, and 262 are therefore associated with Row-A geometric shape ID, as shown in element 248.

Similarly, the MBR of geometric shape B, as shown in element 224b of FIG. 2B, overlaps with the following grid cells 206; grid cell (4,2) as shown in element 264 of FIG. 2D, grid cell (5,2) as shown in element 266, grid cell (4,3) as shown in element 268, grid cell (5,3) as shown in element 270, grid cell (4,4) as shown in element 272, and grid cell (5,4) as shown in element 274. Elements 264, 266, 268, 270, 272, and 274 overlap with the MBR of geometric shape B and are therefore associated with Row-B geometric shape ID, as shown in element 250.

Also, the MBR of geometric shape C as shown in element 224c of FIG. 2B overlaps with the following grid cells 206; grid cell (1,5) as shown in element 275 of FIG. 2D, grid cell (2,5) as shown in element 276, grid cell (3,5) as shown in element 277, grid cell (4,5) as shown in element 278, grid cell (1,4) as shown in element 279, grid cell (2,4) as shown in element 280, grid cell (3,4) as shown in element 281, and grid cell (4,4) as shown in element 282. Elements 275, 276, 277, 278, 279, 280, 281, and 282 are therefore associated with Row-C geometric shape ID, as shown in element 252.

Conceptually, and optionally in practice, the storage pool is a separate and distinct storage area from the grid index. Because a filtering operation will be applied to all of the geometric shapes in the storage pool to determine if they are candidates for satisfying a query, there is no need to index those shapes in the storage pool. Accordingly, the storage pool can include a pool data structure that contains only identifiers of the geometric shapes stored in the pool. When the filtering operation occurs, all the identifiers in the storage pool are output so that those geometric shapes in the pool can be filtered. Here, the filtering is performed on the MBRs of the geometric shapes identified in the storage pool, and the MBRs of the geometric shapes in the pool can be stored in the storage pool data structure.

Figure 2E:
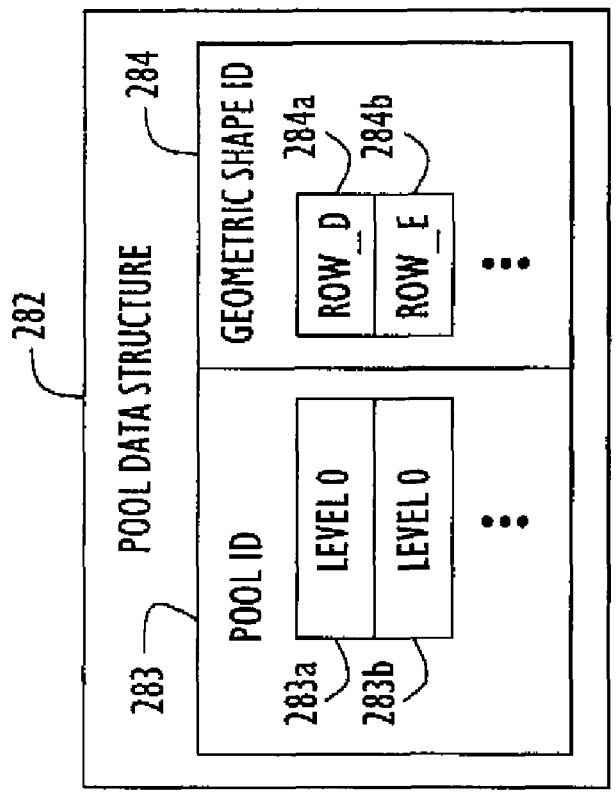
FIG. 2E is a block diagram that illustrates a pool data structure and a table relating geometric shapes with an identifier.
Figure 2E:
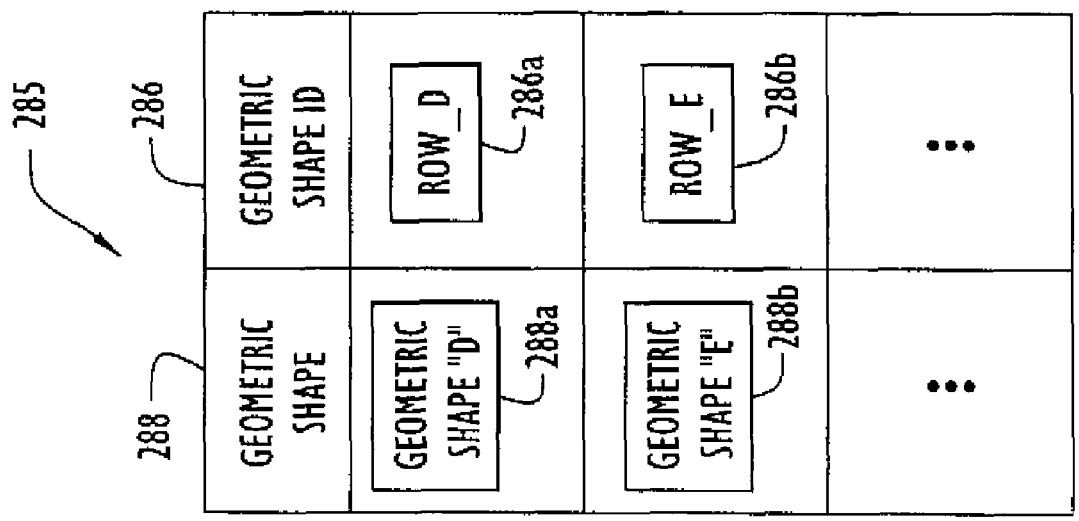

Alternatively, identifiers of the large geometric shapes that exceed a certain threshold, and hence are stored in the pool, can be stored in the grid index data structure along with the grid indexes. FIG. 2E illustrates a pool data structure 282 that is part of the grid index data structure. As shown in FIG. 2E the pool data structure 282 includes a pool ID field 283 and a geometric shape ID field 284. The geometric shape ID is an identifier for a geometric shape that is so large as to exceed the threshold. Because geometric shape IDs in the pool are recorded with the grid cell indexes, an identifier is needed to designate those large geometric shapes as belonging to the pool and not to the grid index. The pool ID serves that purpose and can be any identifier that is different from the grid cell IDs 245, shown in FIG. 2D. An example of such a pool ID is shown in FIG. 2E in which an unused grid level, in this instance grid level "0", operates as an indicator that the associated geometric shape is part of the pool and not part of the grid index. In FIG. 2E, the geometric shape "D" has a geometric shape ID 284*a* of "Row_D" and an associated pool ID 283*a* of "Level 0." Similarly, another entry in the pool, geometric shape "E", has a geometric shape ID 284*b* of "Row_E" and an associated pool ID 283*b* of "Level 0." Although the pool IDs of shapes "D" and "E" are identical, namely "Level 0", they serve to designate those shapes as part of the pool and not part of the grid index.

Similar to table 240 in FIG. 2D, a table 285 in FIG. 2E relates a geometric shape ID 286 with a geometric shape 288. Here, the geometric shape ID 286*a* for shape "D" points to the area where geometric shape "D" 288*a* is stored. Similarly the geometric shape ID 286*b* for shape "E" points to the area where geometric shape "E" 288*b* is stored.

Figure 3A:
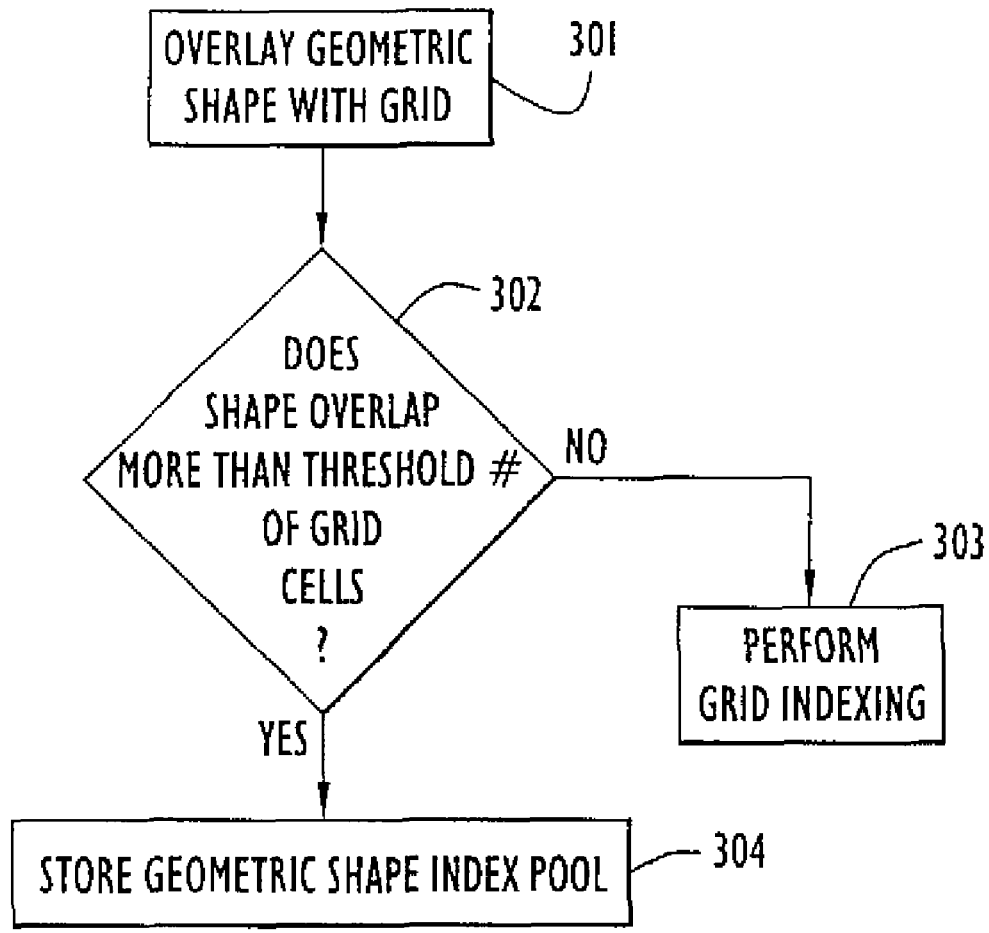
FIG. 3A is a flow diagram that illustrates an embodiment of determining whether to store an index in a pool storage area.

The flow diagram of FIG. 3A illustrates formation of the grid index and storage in a storage pool. A grid is first laid over the MBRs of a geometric shape, as depicted by operation 301. A determination is then made as to whether the shape overlaps more than a threshold number of grid cells, as depicted by element 302. If the threshold of grid cells is not exceeded than the geometric shape is stored in the grid index 251 as depicted by element 303. However, if the geometric shape overlaps more than the threshold number of grid cells, an index for the geometric shape is stored in the storage pool, as depicted by element 304.

In one embodiment, the threshold number of grid cells is thirty cells, it being understood that a smaller or larger number may be preferred in accordance with the specific application. Accordingly, geometries overlaying more than thirty cells will have a single index for the geometry stored in the pool 280 and will not have a plurality of indices stored in the index data structure 251.

Figure 3B:
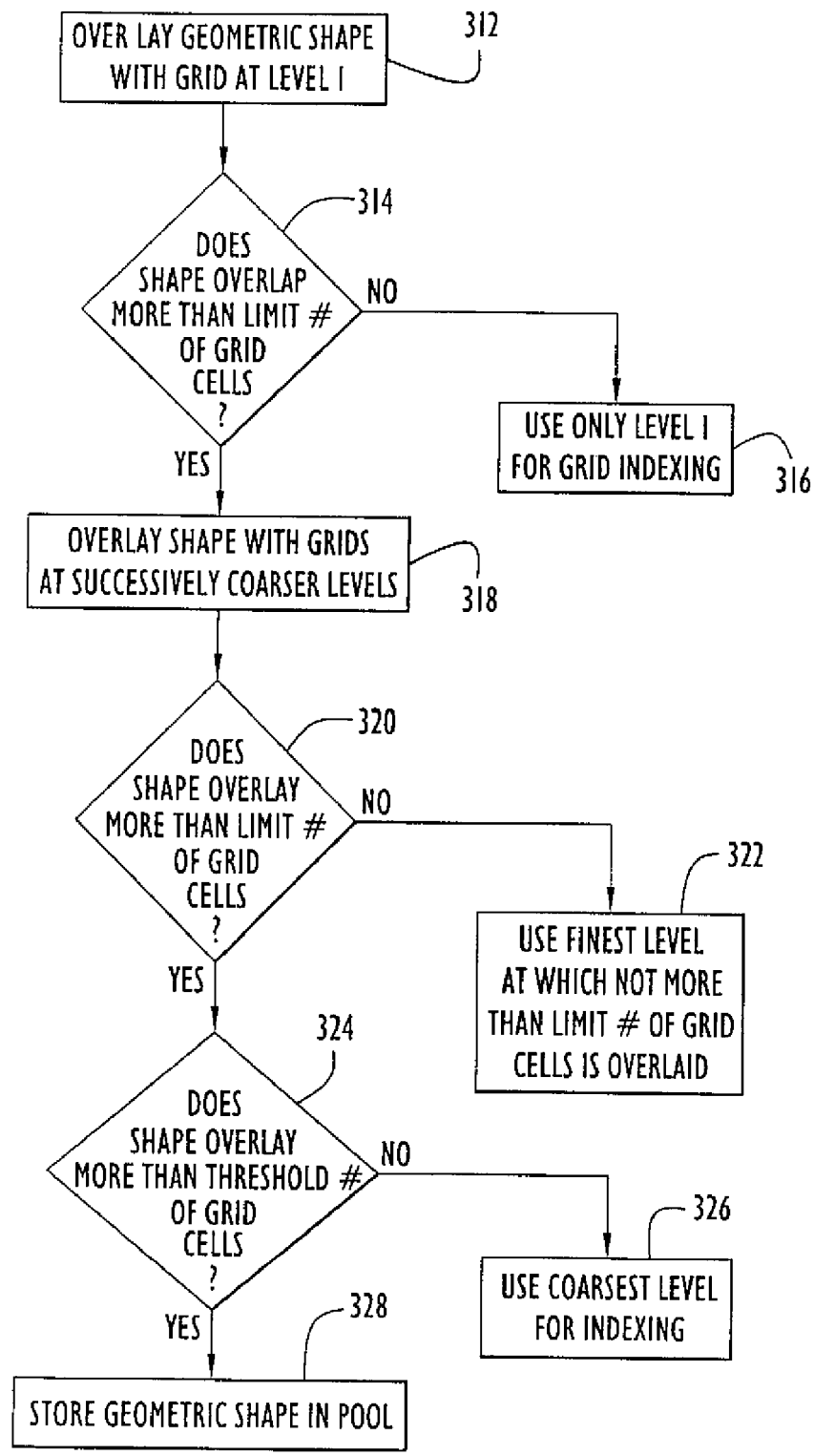
FIG. 3B is a flow diagram that illustrates a further embodiment of determining whether to store an index in a pool storage area.

Instead of using a grid having a single level, it may be preferable to use a multi-level grid, which for example could have three levels of progressively increasing grid cell size. Referring to FIG. 3B, which, is a flow diagram for such a system, a grid at level 1 (the finest level) first would be laid over a geometric shape as depicted by element 312. A determination would then be made as to whether the grid at level 1 overlaps more than a defined limit number of grid cells, which for example could be four grid cells, as depicted by element 314. If the shape does not overlap more than four cells, then level 1 is used for indexing of the geometric shape, as depicted by element 316. On the other hand, if the shape does overlap more than four grid cells, the next coarsest grid level is used, and the same determination is made, as depicted by elements 318 and 320. If the grid cell overlaps more than four grid cells then progressively coarser grids are used, and the finest grid level at which not more than four grid cells are overlapped is used for grid indexing, as depicted by element 322.

If even at the coarsest grid level more than four grid cells are overlapped, then a determination is made if more than the threshold number of grid cells is overlapped, as depicted by element 324. If fewer than the threshold number are overlapped, than the coarsest grid level is used for grid indexing, as shown by element 326. However, if the threshold number is exceeded, then indices for the geometric shape are not placed in the index data structure, but rather one index for the entire geometric shape is placed in the storage pool, as depicted by element 328.

As previously described, use of the pool is advantageous because it reduces the number of entries in the grid index. Computation of such index entries is expensive, and maintenance of the index is simplified by the reduction in size. Use of the present invention is effective to enhance index performance for the rest of the data in the index.

Figure 3C:
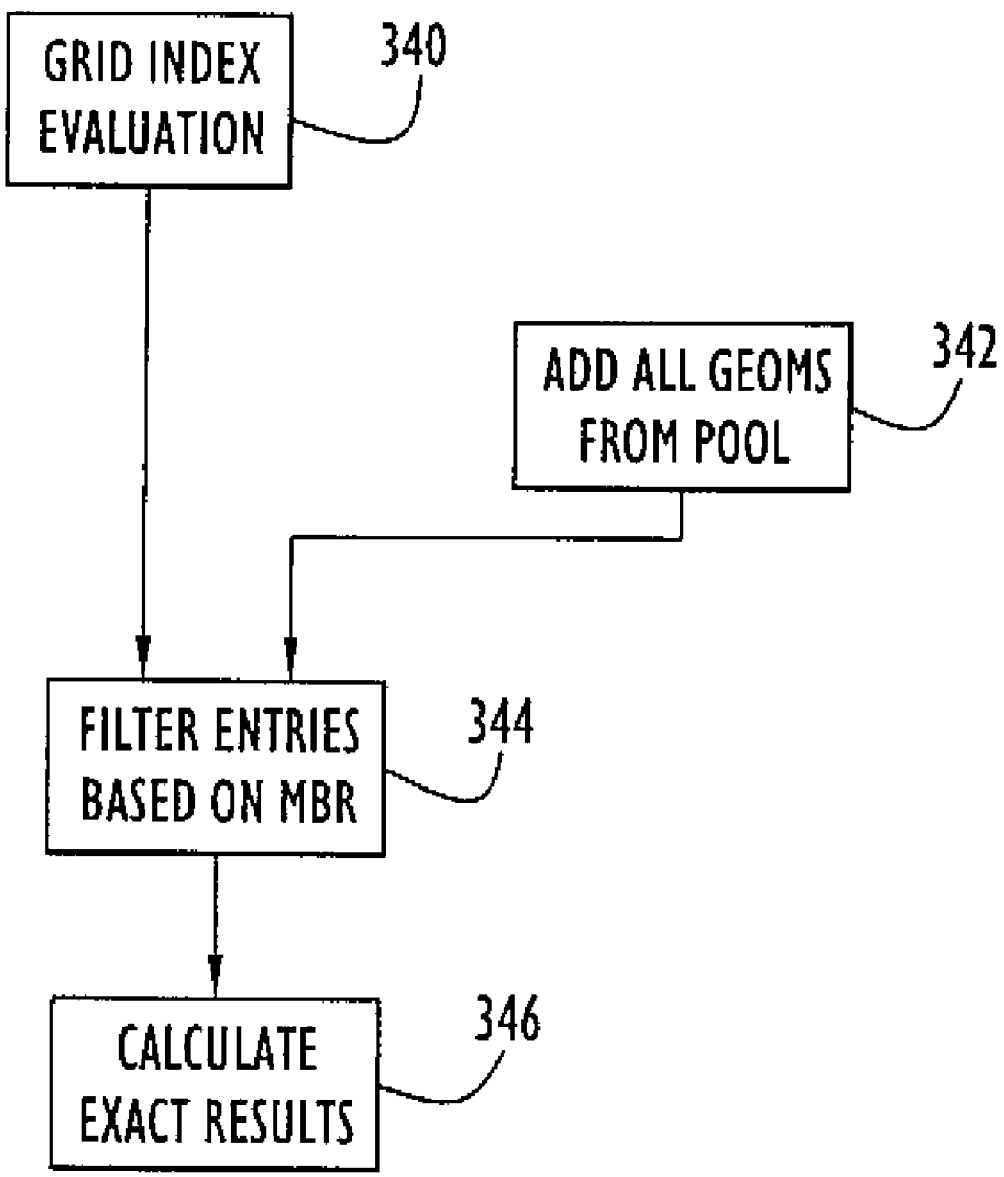
FIG. 3C is a flow diagram that illustrates an embodiment using indices stored in the pool storage area.

When the grid index is queried to retrieve selected geometric shapes, the storage pool must be queried as well so as to consider all shapes. A flow diagram that illustrates an embodiment of the query operation is shown in FIG. 3C. This flow diagram is to be considered in connection with the grid, associated geometric shapes and query box 140 shown in FIG. 2B.

Referring to FIG. 2B, the query box 140 defines the area of interest in which it is desired to search for certain geometric shapes. For example, the query box may be drawn on a monitor screen by an operator performing the query operation, and may represent a geographical area having geographical features with different geometric shapes.

Referring to FIG. 3C, first of the grid indices is evaluated, depicted by element 340. Referring again to FIG. 2B, the grid index evaluation step determines from the index information held in the index data structure 251 (FIG. 2D) whether the MBR of any geometric shape is present in the grid cells overlapped by the query box, that is, whether the MBR of any shape overlaps grid cells (4,5) or (5,5). Referring to the grid index shown in FIG. 2D, a shape is determined to be present in cell (4,5) but not in cell (5,5). Therefore, cell (4,5) is retained as containing a candidate shape, while cell (5,5) is no longer considered in the evaluation. Because very large shapes are not indexed in the index data structure 251, grid indexes for those shapes are not evaluated in operation 340, thereby saving computational time and resources.

Next, in operation 344 possible shapes in both the index and pool are filtered based on the location of the MBR of the candidate shapes and the query box. It is at this step that all geometries from the pool are added to possible candidates from the index.

Referring again to FIG. 2B, it is seen that the right, vertically oriented side of the MBR of shape "C" falls within the query box 140. Hence, the MBR of shape "C" overlays the query box and accordingly shape "C" survives the filtering 344 and remains a candidate. The grid itself is not used in the filtering 344, but rather there is a positional determination of whether there is an overlap between the MBR (which can be stored in the grid index) and the query box. The positional determination can be a computation of whether the maximum X coordinate of either of the rectangles falls between the minimum and maximum X coordinates of the other rectangle, and if so, whether the maximum Y coordinate of either rectangle falls between the minimum and maximum Y coordinates of the other rectangle.

The geometries in the pool are also filtered at element 344 based on whether there is an overlap between their MBR's and the query box. As can be seen by referring to FIG. 2B, there would be an overlap of the MBR (not shown) for shape "D" 228 and the query box, so both shape "C" from the index and shape "D" from the pool survive the filtering, while shape "E" 230 from the pool does not.

Next, for the remaining candidate shapes that survive MBR filtering, operation 346 determines whether the exact geometric shape for each remaining candidate falls within the query box 140. Pointers to the exact shape information are stored within the grid index or within the storage pool for large geometries. As can be seen by referring to FIG. 2B, the rightmost point of shape "C" falls within the query box, so the determination for shape "C" is that the exact shape is within the query box. Similarly, the exact shape "D" falls within the query box, so the same determination is made for that shape. Suitable algorithms for making the exact shape computation are well known to those skilled in the art. In this manner geometric shapes that intersect a query area are returned.

According to the above procedure, all geometries from the pool are added to the set of possible candidates from the grid index evaluation. This ensures that no geometry will be missed during the query process.

Of course, a drawback is that a geometry from the separate pool might have been eliminated in the grid index evaluation if it were indexed in the grid index, but now it is added to the set of possible candidates due to the processing of the separate pool. However, only very few geometries should be in the separate pool. If there are many geometries, those would not be special cases but rather common cases and the grid index should be tuned for them. But if the grid index is tuned for them, these geometries would be in the grid index itself and not in the separate pool. Also, the last two operations in the query are: (a) filtering based on the MBR 344, and (b) using the exact geometry to determine the result 346. If a geometry would have been filtered out by the grid index evaluation but is now added by the separate pool, operation (a) will filter it out before operation (b) performs the more expensive calculation, so the impact is rather marginal.

Figure 4:
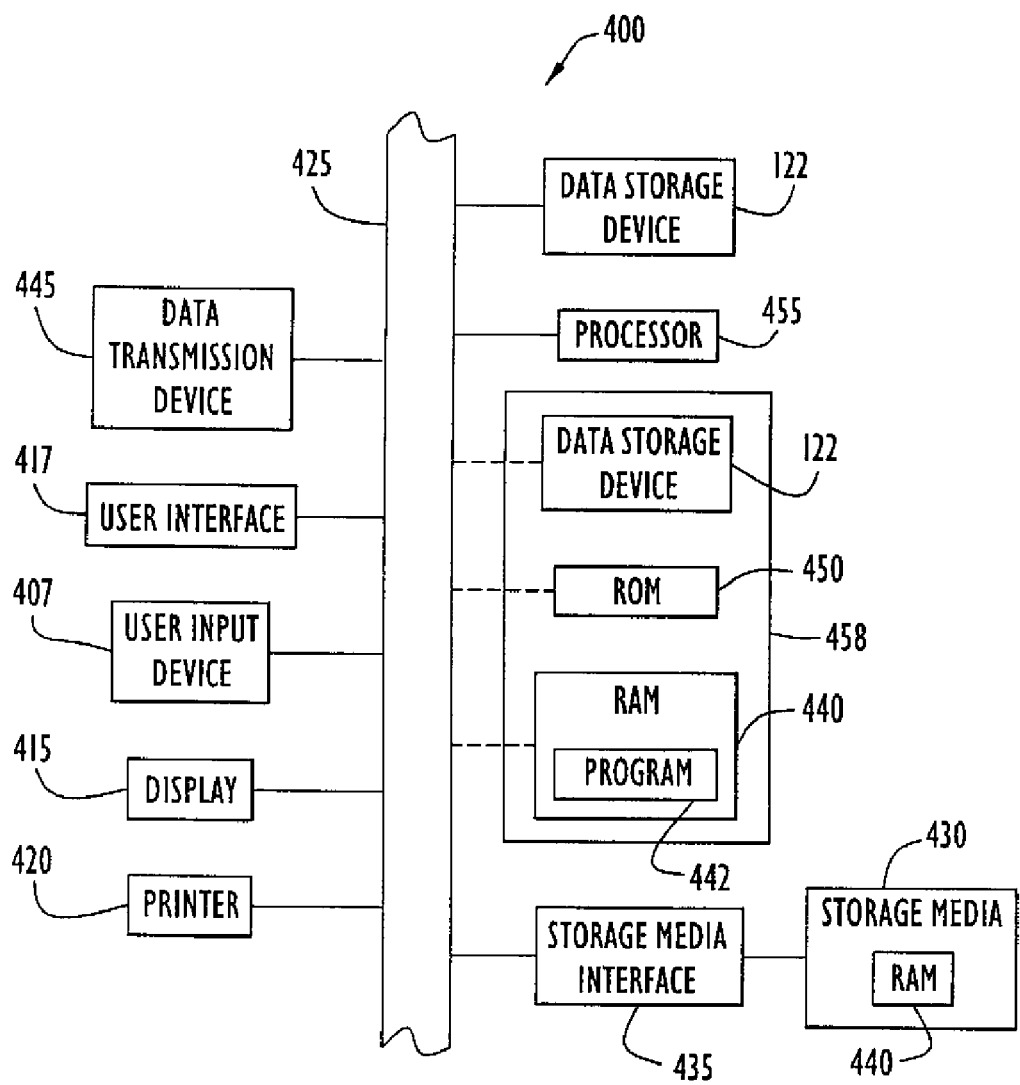
FIG. 4 is a block diagram of a computer system suitably configured for employment of the present invention.

FIG. 4 is a block diagram of a computer system 400, suitable for employment of the methods described here. System 400 can be implemented on a general-purpose microcomputer, such as one of the members of the IBM Personal Computer family, or other conventional workstation or graphics computer devices, or mainframe computers. In its preferred embodiment, system 400 includes a user interface 417, a user input device 407, a display 415, a printer 420, a processor 455, a read only memory (ROM) 450, a data storage device 122, such as a hard drive, a random access memory (RAM) 440, and a storage media interface 435, all of which are coupled to a bus 425 or other communication means for communicating information. Although system 400 is represented herein as a standalone system, it is not limited to such, but instead can be part of a networked system. For example, the computer system 400 may be connected locally or remotely to fixed or removable data storage devices 122 and data transmission devices 445. Further the computer system 400, such as the server computer system 102 or the client computer system 104 shown in FIG. 1A, also could be connected to other computer systems via the data transmission devices 445.

The RAM 440, the data storage device 122 and the ROM 450, are components of a memory unit 458 that stores data and instructions for controlling the operation of processor 455, which may be configured as a single processor or as a plurality of processors. The processor 455 executes a program 442 recorded in one of the computer-readable storage media described above, to perform the methods of the present invention, as described herein.

While the program 442 is indicated as loaded into the RAM 440, it may be configured on a storage media 430 for subsequent loading into the data storage device 122, the ROM 450, or the RAM 440 via an appropriate storage media interface 435. Storage media 430 can be any conventional storage media such as a magnetic tape, an optical storage media, a compact disk, or a floppy disk. Alternatively, storage media 430 can be a random access memory 440, or other type of electronic storage, located on a remote storage system.

Generally, the computer programs and operating systems are all tangibly embodied in a computer-readable device or media, such as the memory 458, the data storage device 122, or the data transmission devices 445, thereby making an article of manufacture, such as a computer program product. As such, the terms "computer program product" as used herein are intended to encompass a computer program 442 accessible from any computer readable device or media.

Moreover, the computer programs 442 and operating systems are comprised of instructions which, when read and executed by the computer system 400, cause the computer system 400 to perform the steps necessary to implement and use the methods and systems described here. Under control of the operating system, the computer programs 442 may be loaded from the memory 458, the data storage device 122, or the data transmission devices 445 into the memories 458 of the computer system 400 for use during actual operations. Those skilled in the art will recognize many modifications may be made to this configuration without departing from the scope of the present invention.

The user interface 417 is an input device, such as a keyboard or speech recognition subsystem, for enabling a user to communicate information and command selections to the processor 455. The user can observe information generated by the system 400 via the display 415 or the printer 420. The user input device 407 is a device such as a mouse, track-ball, or joy-stick, which allows the user to manipulate a cursor on the display 415 for communicating additional information and command selections to the processor 455.

While operating in accordance with the present invention, the system 400 determines which geometric shapes in the database are to be loaded into the grid index and which into the storage pool. It also operates to query both the grid index and storage pool in such manner that all geometric shapes are considered during the query operation.

The methods and systems described here are typically implemented using one or more computer programs 442, each of which is executed under the control of an operating system and causes the system 400 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims. For example, although the embodiments are described here with reference to storage and evaluation of geometric shapes, the invention can apply to other types of data objects for which a varying number of indexes can be generated. For such other types of data objects, if a number of index entries generated for such a data object exceeds a certain threshold, the data object, or an identifier of that data object is recorded in a storage pool. If the number of index entries does not exceed the threshold than the data object, or its identifier, is recorded in an index data structure.

TRADEMARKS

IBM is a trademark or registered trademark of International Business Machines, Corporation in the United States and other countries.

DB2 is a trademark or registered trademark of International Business Machines, Corporation in the United States and other countries.

What is claimed is:

1. A computer program for reducing the number of index entries for use in an index for indexing an object, the computer program having program instructions executable by a computer and recorded on a computer-readable medium to perform:
    determining whether a number of grid cells the object overlaps is more than a defined limit number of grid cells at successively coarser levels of a multilevel grid index until it is determined that the number of grid cells that the object overlaps at one of the levels of the multilevel grid index does not exceed the defined limit number of grid cells or it is determined that the number of grid cells that the object overlaps exceeds the defined limit number of grid cells at a coarsest level;
    in response to determining that the number of grid cells that the object overlaps at one of the levels of the multilevel grid index does not exceed the defined limit number of grid cells, using that level of the multilevel grid index for grid indexing; and
    in response to determining that the object overlaps more than the defined limit number of grid cells at the coarsest level,
        determining a number of index entries for the object;
        storing the index entries in the multilevel grid index if the number of index entries does not exceed a threshold number using the coarsest level of the multilevel grid index for grid indexing; and
        storing an indicator of the object in a pool storage area if the number of index entries exceeds the threshold number.

2. The computer-program of claim 1, wherein the object is a geometric shape, and said determining a number of index entries is based on how many cells the object overlaps.

3. The computer-program of claim 2, further performing:
    selecting the threshold number of grid cells that a geometric shape may overlap; and
    establishing the pool storage area for storing indicators of geometric shapes overlapping the number of grid cells exceeding the threshold number.

4. The computer-program of claim 2, wherein the geometric shapes are from a database of geometric shapes.

5. The computer-program of claim 4, wherein an indicator for each geometric shape in the database that overlaps a number of grid cells exceeding the threshold number is stored in the pool storage area.

6. The computer-program of claim 2, wherein the multilevel grid index includes a data structure and if one of said geometric shapes is placed in the pool storage area, an identifier representative of such geometric shape is placed in the data structure of the multilevel grid index.

7. The computer-program of claim 2, wherein the threshold number of grid cells is related to the coarsest level of the multilevel grid index.

8. A computer system for indexing objects, comprising:
    an index comprised of a plurality of index entries for storing indicators of first objects, wherein the index is a multilevel grid index;
    a pool storage area for storing an indicator of second objects that are not stored in the multilevel grid index, wherein a number of index entries for the second objects if stored in the multilevel grid index is greater than a threshold number;
    means for determining whether a number of grid cells the object overlaps is more than a defined limit number of grid cells at successively coarser levels of the multilevel grid index until it is determined that the number of grid cells that the object overlaps at one of the levels of the multilevel grid index does not exceed the defined limit number of grid cells or it is determined that the number of grid cells that the object overlaps exceeds the defined limit number of grid cells at a coarsest level; and
    means for, in response to determining that the number of grid cells that the object overlaps at one of the levels of the multilevel grid index does not exceed the defined limit number of grid cells, using that level of the multilevel grid index for grid indexing.

9. The computer system of claim 8, wherein the first and second objects are geometric shapes.

10. The computer system of claim 9, wherein the pool storage area is for storing indicators of geometric shapes that overlap more than a preselected threshold number of grid cells if the multilevel grid index is laid over said geometric shapes.

11. The computer system of claim 10, wherein the multilevel grid index contains stored geometric shapes and wherein the pool storage area contains larger geometric shapes.

12. The computer system of claim 11, wherein the multilevel grid index includes a data structure and for each geometric shape in the pool storage area there is an identifier in the data structure of the multilevel grid index.

13. The computer system of claim 10, further comprising:
    in response to determining that the object overlaps more than the defined limit number of grid cells at the coarsest level,
        means for storing the shape in the multilevel grid index if a geometric shape overlaps a number of cells that does not exceed the threshold number using the coarsest level of the multilevel grid index for grid indexing; and means for storing the shape in the pool storage area if a geometric shape overlaps a number of grid cells exceeding the threshold number.

* * * * *